United States Patent Office 3,113,165
Patented Dec. 3, 1963

3,113,165
POLYMERIZATION OF UNSATURATED
ORGANIC COMPOUNDS
Herman S. Bloch, Skokie, Ill., assignor to Universal Oil
Products Company, Des Plaines, Ill., a corporation of
Delaware
No Drawing. Filed Sept. 1, 1960, Ser. No. 53,341
15 Claims. (Cl. 260—683.15)

This application relates to a process for the polymerization of unsaturated organic compounds. More particularly the invention is concerned with a novel method for initiating the polymerization of unsaturated organic compounds and specifically unsaturated organic hydrocarbons such as olefins and diolefins.

The polymerization of unsaturated organic compounds such as olefins and dienes is an important process in the chemical and allied industries. For example, many unsaturated compounds can be polymerized and the resulting long-chain compounds used for plastics or resins, examples of such plastics being polyethylene or polystyrene. In addition, normally gaseous olefins such as propylene or butylenes may be polymerized to form polymers thereof which will enhance the octane ratings of gasoline. As hereinbefore stated this invention concerns a new process for making macromolecular polymers from olefins and dienes by initiating the reaction by including a relatively small amount of an olefin derivative such as an olefin oxide, olefin imine or olefin sulfide along with the unsaturated hydrocarbon which is to be polymerized. When low concentrations of these polymerization inducing compounds are used the carbanions which are initially formed will induce the polymerization of the olefins and dienes as a chain-carrying reaction, thus allowing the use of a relatively small amount of catalyst.

It is known in the prior art that unsaturated organic compounds and particularly unsaturated organic hydrocarbons may be polymerized in the presence of metallic catalyst which per se are capable of polymerizing monomers. In addition it is also known that oxygen containing compounds such as ethers, examples of which include ethyl ether or diphenyl ether, may be utilized along with the metallic catalyst as a modifier for the catalyst. However, the metallic catalyst, as hereinbefore indicated, is itself capable of polymerizing unsaturated compounds.

As hereinabove set forth, I have now discovered that certain carbanion inducing compounds of the type hereinafter set forth, as distinguished from the polymerization inducing metals of the prior art, will not per se polymerize monoolefins or diolefins, as will the metal, but will co-act with a polymerization inducing or initiating compound of the type hereinafter set forth to permit the polymerization of the unsaturated hydrocarbons.

It is therefore an object of this invention to provide a process for polymerizing unsaturated organic compounds.

A further object of this invention is to provide a novel method for initiating the polymerization of unsaturated hydrocarbons such as monoolefins and diolefins.

One embodiment of this invention resides in a process for the polymerization of unsaturated organic compounds containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the unsaturated organic compound in the presence of a catalyst comprising a carbanion inducing basic compound selected from the group consisting of the hydroxides, acetates, amides, carbonates, phenolates, borates and phosphates of alkali metals and alkaline earth metals, said polymerization being effected at polymerization conditions, and recovering the resultant polymerized compounds.

A further embodiment of this invention is found in a process for the polymerization of a compound selected from the group consisting of monoolefinic and diolefinic hydrocarbons containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the unsaturated organic hydrocarbon in the presence of a catalyst comprising a carbanion inducing basic compound selected from the group consisting of the hydroxides, acetates, amides, carbonates, phenolates, borates and phosphates of alkali metals and alkaline earth metals, said polymerization being effected at polymerization conditions, and recovering the resultant polymerized hydrocarbons.

A specific embodiment of this invention is found in a process for the polymerization of ethylene which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the ethylene in the presence of a catalyst comprising a carbanion inducing basic compound selected from the group consisting of the hydroxides, acetates, amides, carbonates, phenolates, borates and phosphates of alkali metals and alkaline earth metals, said polymerization being effected at a temperature in the range of from about 50° to about 300° C. and at a pressure in the range of from about 1 to about 350 atmospheres, and recovering the resultant polymerized ethylenes.

A more specific embodiment of the invention resides in a process for the polymerization of ethylene which comprises initiating said polymerization by the addtiion of ethylene oxide in an amount of from about 0.01 to about 10% by weight of the ethylene in the presence of a sodium hydroxide catalyst, said polymerization being effected at a temperature in the range of from about 50° to about 300° C. and at a pressure in the range of from about 1 to about 350 atmospheres, and recovering the resultant polymerized ethylene.

Other objects and embodiments referring to alternative unsaturated compounds, alternative olefin oxides, imines and sulfides, and carbanion inducing catalysts will be found in the following further detailed description of the invention.

As hereinbefore set forth it has now been discovered that the polymerization of unsaturated organic compounds and particularly unsaturated organic compounds such as olefins and dienes containing up to 5 carbon atoms may be effected in the presence of certain carbanion inducing basic compounds and a polymerization inducing compound. Examples of unsaturated compounds which may be polymerized according to the process of this invention include ethylene, propylene, butene-1, butene-2, isobutene, amylene-1, amylene-2, isoamylene, 1,3-butadiene, 1,3-pentadiene, 1,4-pentadiene, 2-methyl-1,3-butadiene (isoprene), etc. It is also contemplated within the scope of this invention that known hydrocarbon monomers such as (for example, the vinyl halides, vinyl esters, acrylates and the like such as acrylonitrile, vinyl chloride, vinyl bromide, vinyl acetate, vinyl propionate, allyl chloride, allyl bromide, as well as unsaturated hydrocarbons containing more than five carbon atoms such as styrene, the vinyl toluenes, indene and the like may also be polymerized according to the present process utilizing the carbanion inducing catalyst and the olefinic compound initiator although not necessarily with equivalent results. Furthermore, under specific reaction conditions it is also contemplated that mixtures of the above mentioned olefins and diolefins may be copolymerized according to the process of the present invention.

Examples of compounds which initiates the polymerization of the unsaturated hydrocarbon include ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene mono- and dioxide, cyclohexene oxide, vinyl-cyclohexene monoxide, etc. These olefin derivatives may be present in an amount of from about 0.01% to about 10%. The polymerization of the aforementioned compounds takes place at a temperature in the range of from about 50° to about 300° C. and at a pressure in the range of from about atmospheric to about 5000 p.s.i., or from about 1 to about 350 atmospheres.

In addition, the initiation of the polymerization reaction takes place in the presence of a carbanion inducing catalyst. Examples of the aforesaid catalysts include basic substances such as the hydroxides, acetates, amides and substituted amides, carbonates, phenolates, borates, and phosphates of the alkali metals and alkaline earth metals, such as sodium hydroxide, sodamide, sodium amilide, sodium acetate, sodium carbonate, sodium phenolate, sodium phosphate, lithium hydroxide, lithium acetate, lithium carbonate, lithium phosphate, potassium hydroxide, potassium acetate, potassium carbonate, potassium phenolate, potassium phosphate, rubidium hydroxide, rubidium acetate, rubidium carbonate, rubidium phenolate, rubidium phosphate, cesium hydroxide, cesium acetate, cesium carbonate, cesium phenolate, cesium phosphate, magnesium hydroxide, magnesium acetate, magnesium phenolate, calcium hydroxide, calcium acetate, calcium phenolate, barium hydroxide, barium acetate, barium phenolate, strontium hydroxide, strontium acetate, strontium phenolate, etc., although not all of the above compounds are equally effective. Generally only about 1 to about 50% by weight of such catalysts, based on the initiating olefin derivatives used, is sufficient.

The process of this invention may be effected in any suitable manner and may comprise either a batch or a continuous type operation. For example, when a batch type operation is used a quantity of the polymerization-inducing compound, that is, the olefin derivative such as the olefin oxide, imine or sulfide along with the unsaturated hydrocarbon to be polymerized is placed in an appropriate apparatus. The particular catalyst chosen is charged thereto or otherwise placed therein separately from the polymerization-inducing compound. The apparatus is heated to the desired temperature and maintained thereat for a predetermined period of time while under a pressure in the aforementioned range. At the end of this time the flask and contents thereof are cooled to room temperature, the excess pressure vented, and the polymerization products are separated from any unreacted starting materials by conventional means such as fractional precipitation, distillation, etc.

Another method of polymerizing the unsaturated hydrocarbons according to this invention comprises a continuous type operation. In this operation the unsaturated hydrocarbons to be polymerized are continuously charged to a reaction zone containing the carbanion inducing catalyst which is maintained at the proper operating conditions of temperature and pressure. The reaction zone may comprise an unpacked vessel or coil, or may be lined with an absorbent packing material such as fire brick, dehydrated bauxite, alumina and the like. The polymerization inducing olefin derivative is also continuously charged through separate means or, if so desired, may be admixed with the olefin prior to introduction into the vessel and charged thereto in a single line. The reaction product, comprising the polymerized unsaturated hydrocarbons is continuously withdrawn, separated from the reactor effluent and purified by conventional means hereinbefore set forth, while the unreacted starting materials may be separated and recycled as a portion of the feed stock. A particularly suitable type of operation comprises a fixed bed type in which the carbanion inducing catalyst is disposed as a fixed bed in the reactor and the olefin and initiator are passed therethrough in either an upward or downward flow. Another type of continuous operation which may be used is the fluidized type in which the catalyst, initiator, and olefin are maintained in a state of turbulence under hindered settling conditions.

The following examples are given to illustrate the process of the present invention which, however, are not intended to limit the generally broad scope of the present invention in strict accordance therewith.

*Example I*

One gram of powdered dry sodium hydroxide comprising the catalyst is placed in an autoclave which is provided with heating and stirring means. The flask is heated to a temperature of approximately 150° C. while ethylene is charged into said autoclave until a pressure of approximately 1000 p.s.i. at the elevated temperature has been reached. A mixture of ethylene and ethylene oxide containing 5% of the latter is then added, until a total pressure of 1250 p.s.i. is reached. The temperature rises slowly while the pressure drops, and after approximately one hour the autoclave and contents are cooled to room temperature. The excess ethylene is vented and the reaction product, comprising a semisolid polyethylene, is recovered from the autoclave.

*Example II*

One-half gram of powdered dry sodium carbonate is placed in an autoclave provided with heating and stirring means. A mixture of 5 g. of ethylene imine and 450 g. of propylene is added slowly, and the autoclave is then slowly heated to a temperature of approximately 150° C. The autoclave and contents thereof are maintained at the aforementioned temperature for a period of about two hours, during which time there is a large drop in pressure, and at the end of this time the autoclave and contents thereof are cooled to room temperature. The excess pressure is vented and the reaction product, comprising a liquid mixture of propylene polymers, is recovered from the autoclave.

*Example III*

One-tenth gram of potassium hydroxide and 2 g. of propylene sulfide, comprising the catalyst and polymerization including olefin derivative, and 100 g. of styrene are placed in a heavy-walled glass tube, air is swept out of the tube with nitrogen, and the tube is sealed. The tube is then heated in an oil bath to a temperature of approximately 135° C. for one hour, with shaking on an automatic shaking machine while immersion of the tube in the oil is maintained. At the end of this time the tube and contents thereof are cooled to room temperature. The styrene is found to have polymerized to polystyrene, which by analysis contains sulfur compounds originating from the propylene sulfide.

*Example IV*

One gram of calcium hydroxide is placed in an autoclave provided with heating and stirring means. A mixture of 5 g. of ethylene sulfide and 200 g. of ethylene is slowly added to the autoclave which is thereafter heated to a temperature of approximately 150° C. The autoclave and contents thereof are maintained at the aforementioned temperature for a period of about 2 hours, during which time there is a large drop in pressure. At the end of this time, the autoclave and contents thereof are cooled to room temperature, the excess pressure is vented and the reaction mixture, comprising a liquid mixture of ethylene polymers is recovered in the autoclave.

*Example V*

In this experiment 1 g. of sodium amide is placed in a rotating autoclave and a mixture of 5 g. of propylene oxide and 200 g. butene-1 is slowly added thereto. The autoclave is sealed and slowly heated to a temperature of about 150° C., the autoclave and contents thereof being maintained at this temperature for a period of about 2 hours. At the end of the aforementioned period of time the autoclave and contents thereof are allowed to cool to room temperature, the excess pressure is vented and the reaction products, comprising liquid polymer, are recovered from the autoclave.

*Example VI*

One-half gram of potassium carbonate is placed in an autoclave provided with heating and stirring means. A mixture of 2 g. of propylene imine and 30 g. of propylene is slowly added to the autoclave which is thereafter sealed and heated to the desired reaction temperature of approximately 150° C. The autoclave and contents thereof are maintained at this temperature for a period of about 2 hours during which time a drop in pressure is noted. At the end of the predetermined residence time the autoclave and contents thereof are allowed to cool to room temperature, the excess pressure is vented and the reaction mixture comprising polypropylenes is separated and recovered.

*Example VII*

In this example 1 g. of magnesium acetate is placed in the autoclave provided with heating and stirring means. A mixture of 5 g. butylene-1 oxide and 200 g. of pentene-1 is added to the autoclave which is thereafter sealed and heated to a temperature of about 150° C. During the predetermined residence time of approximately 2 hours duration a drop in pressure is noted. At the end of this reaction time the autoclave and contents thereof are allowed to cool to room temperature, the excess pressure is vented and the reaction product comprising polymerized pentenes is separated and recovered.

I claim as my invention:

1. A process for the polymerization of unsaturated organic compounds containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the unsaturated organic compound in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of said organic compound in the presence of said olefin derivative and said catalyst, and recovering the resultant polymerized compounds.

2. A process for the polymerization of unsaturated hydrocarbons containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the unsaturated hydrocarbon in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of said hydrocarbon in the presence of said olefin derivative and said catalyst, and recovering the resultant polymerized hydrocarbons.

3. A process for the polymerization of a compound selected from the group consisting of monoolefinic and diolefinic hydrocarbons containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the olefinic hydrocarbon in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of said hydrocarbon in the presence of said olefin derivative and said catalyst, and recovering the resultant polymerized hydrocarbons.

4. A process for the polymerization of a compound selected from the group consisting of monoolefinic and diolefinic hydrocarbons containing up to five carbon atoms which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the olefinic hydrocarbon in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of said hydrocarbon in the presence of said olefin derivative and said catalyst at a temperature in the range of from about 50° to about 300° C. and at a pressure in the range of from about 1 to about 350 atmospheres, and recovering the resultant polymerized hydrocarbons.

5. A process for the polymerization of ethylene which comprises initiating said polymerization by the addition of an olefin derivative selected from the group consisting of ethylene oxide, ethylene imine, ethylene sulfide, propylene oxide, propylene imine, propylene sulfide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the ethylene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the ethylene in the presence of said olefin derivative and said catalyst at a temperature in the range of from about 50° to about 300° C. and at a pressure in the range of from about 1 to about 350 atmospheres, and recovering the resultant polymerized ethylenes.

6. A process for the polymerization of propylene which comprises initiating said polymerization by the addition of an olefinic derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the propylene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the propylene in the presence of said olefin derivative and said catalyst at a temperature in the range of from about 50° to about 300° C. and at a pressure in the range of from about 1 to about 350 atmospheres, and recovering the resultant polymerized propylenes.

7. A process for the polymerization of butadiene which comprises initiating said polymerization by the addition of an olefin derivative selected from the group consisting of ethylene oxide, ethylene imine, ethylene sulfide, propylene oxide, propylene imine, propylene sulfide, butylene-1-oxide, butylene-1-imine, butylene-1-sulfide, butylene-2-oxide, butylene-2-imine, butylene-2-sulfide, isobutylene oxide, isobutylene imine, isobutylene sulfide, styrene oxide, butadiene monoxide, butadiene dioxide, cyclohexene oxide and vinylcyclohexene monoxide in an amount of from about 0.01 to about 10% by weight of the butadiene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the butadiene in the presence of said olefin derivative and said catalyst at a temperature in the range of from about 50° to about 300° C. and at a pressure in the range of from about 1 to about 350 atmospheres, and recovering the resultant polymerized butadienes.

8. A process for the polymerization of ethylene which comprises initiating said polymerization by the addition of ethylene oxide in an amount of from about 0.01 to about 10% by weight of the ethylene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the ethylene in the presence of said oxide and said catalyst at a temperature in the range of from about 50° to about 300° C. and at a pressure in the range of from about 1 to about 350 atmospheres, and recovering the resultant polymerized ethylene.

9. A process for the polymerization of ethylene which comprises initiating said polymerization by the addition of ethylene imine in an amount of from about 0.01 to about 10% by weight of the ethylene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the ethylene in the presence of said imine and said catalyst at a temperature in the range of from about 50° to about 300° C. and at a pressure in the range of from about 1 to about 350 atmospheres, and recovering the resultant polymerized ethylene.

10. A process for the polymerization of ethylene which comprises initiating said polymerization by the addition of ethylene sulfide in an amount of from about 0.01 to about 10% by weight of the ethylene in the presence of a catalyst comprising a carbanion inducing basic compound selected from the group consisting of the hydroxides, acetates, amides, carbonates, phenolates, borates and phosphates of alkali metals and alkaline earth metals, continuing the polymerization of the ethylene in the presence of said sulfide and said catalyst at a temperature in the range of from about 50° to about 300° C. and at a pressure in the range of from about 1 to about 350 atmospheres, and recovering the resultant polymerized ethylene.

11. A process for the polymerization of ethylene which comprises initiating said polymerization by the addition of ethylene oxide in an amount of from about 0.01 to about 10% by weight of the ethylene in the presence of a sodium hydroxide catalyst, continuing the polymerization of the ethylene in the presence of said oxide and said catalyst at a temperature in the range of from about 50° to about 300° C. and at a pressure in the range of from about 1 to about 350 atmospheres, and recovering the resultant polymerized ethylene.

12. A process for the polymerization of ethylene which comprises initiating said polymerization by the addition of ethylene oxide in an amount of from about 0.01 to about 10% by weight of the ethylene in the presence of a sodium carbonate catalyst, continuing the polymerization of the ethylene in the presence of said oxide and said catalyst at a temperature in the range of from about 50° to about 300° C. and at a pressure in the range of from about 1 to about 350 atmospheres, and recovering the resultant polymerized ethylene.

13. A process for the polymerization of pentene-1 which comprises initiating said polymerization by the addition of butylene-1 oxide in an amount of from about 0.01 to about 10% by weight of the pentene-1 in the presence of a magnesium acetate catalyst, continuing the polymerization of the pentene-1 in the presence of said oxide and said catalyst at a temperature in the range of from about 50° to about 300° C. and at a pressure in the range of from about 1 to about 350 atmospheres, and receovering the resulting polymerized pentenes.

14. A process for the polymerization of propylene which comprises initiating said polymerization by the addition of propylene imine in an amount of from about 0.01 to about 10% by weight of the propylene in the presence of a potassium carbonate catalyst, continuing the polymerization of the propylene in the presence of said imine and said catalyst at a temperature in the range of from about 50° to about 300° C. and at a pressure in the range of from about 1 to about 350 atmospheres, and recovering the resultant polymerized propylene.

15. A process for the polymerization of butene-1 which comprises initiating said polymerization by the addition of propylene oxide in an amount of from about 0.01 to about 10% by weight of the butene-1 in the presence of a sodium amide catalyst, continuing the polymerization of the butene-1 in the presence of said oxide and said catalyst at a temperature in the range of from about 50° to about 300° C. and at a pressure in the range of from about 1 to about 350 atmospheres, and recovering the resultant polymerized butene.

References Cited in the file of this patent

UNITED STATES PATENTS

| | | |
|---|---|---|
| 2,336,793 | Layng et al. | Dec. 14, 1943 |
| 2,401,922 | Frey et al. | June 11, 1946 |
| 2,446,132 | Evans | July 27, 1948 |
| 2,825,701 | Hermann et al. | Mar. 4, 1958 |
| 2,837,587 | Hogan | June 3, 1958 |
| 3,017,400 | Bloch | Jan. 16, 1962 |